United States Patent
Wick

[11] 3,809,972
[45] May 7, 1974

[54] ROTARY PLATE CAPACITOR WITH STATOR CONNECTIONS

[75] Inventor: Henning Wick, Nagold, Germany

[73] Assignee: Paul Dau & Co., Nagold, Germany

[22] Filed: Aug. 23, 1973

[21] Appl. No.: 390,789

[30] Foreign Application Priority Data
Aug. 25, 1972  Germany............................ 2241967

[52] U.S. Cl................................. 317/253, 317/254
[51] Int. Cl.............................................. H01g 5/06
[58] Field of Search................ 317/249 D, 253, 254

[56] References Cited
UNITED STATES PATENTS
3,588,642  6/1971  Fabricius........................ 317/249 D

*Primary Examiner*—E. A. Goldberg
*Attorney, Agent, or Firm*—Lawrence E. Laubscher

[57] ABSTRACT

A stator construction for a rotary plate capacitor apparatus, including a housing having opposed pairs of side and end walls, at least portions of said side walls being formed of a synthetic plastic material. The capacitor apparatus includes at least one stator that is supported between the side walls by a pair of connecting members each of which is formed from a conductive blank. Each connecting member includes a first coupling portion that extends through an opening contained in the synthetic plastic portion of the housing, whereby the connecting member is fastened to the housing in an insulated manner. The connecting member includes also second and third portions that extend beyond the housing side wall for electrical connection with the stator and with the corresponding electrical lead, respectively. In one embodiment, the opening in which the connecting member is fastened is a horizontal opening contained in the side wall of the housing, while in a second embodiment, the opening is a vertical opening contained in a horizontal flange provided on the inner surface of each side wall of the housing.

11 Claims, 6 Drawing Figures

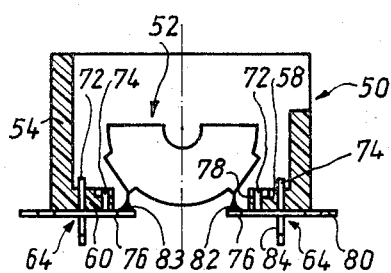
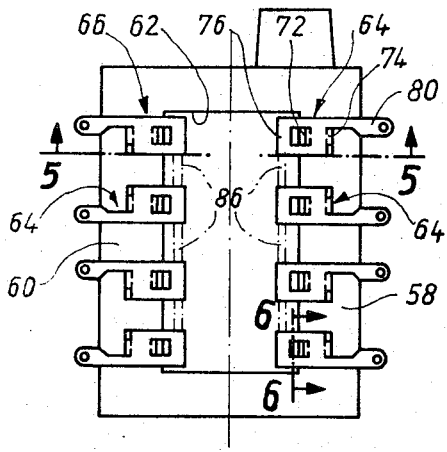
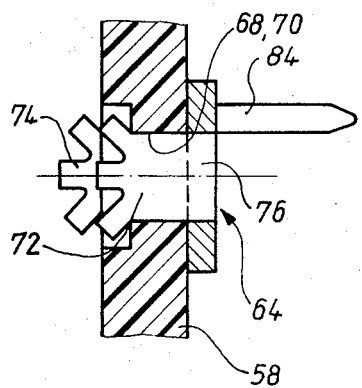

ROTARY PLATE CAPACITOR WITH STATOR CONNECTIONS

SPECIFICATION

This invention relates generally to a rotary plate capacitor including connecting means for fastening the stator in an insulated manner between the opposed side walls of a housing, whereby the stator is adapted to cooperate with a rotor that is journalled between the end walls of the housing.

It is well known in the patented prior art to provide rotary plate capacitors of the type which include a housing made of a shaped metal part from which the stator must be insulated. For this purpose, there is arranged in a housing opening an insulator bushing made of ceramic material and upon one end of which is mounted a metal cap. In this insulator bushing either a soldering eyelet and/or a connecting wire is introduced for the purpose of fastening the stator and for its connection, whereby at least the connection was arranged to project from the accessible end of the insulator bushing. Finally, the actual fastening of the stator to this insulator bushing was accomplished by soldering one of its stator plates, previously adjusted in the housing, in one operation, both against the metal cap of the insulator bushing and against the soldering eyelet or on the connecting wire.

This known design thus requires several individual parts for the insulated fastening and connection of the stator in the housing, and this large number of individual parts — together with their manufacture, arrangement, and mutual connection — to a considerable extent determine the cost of producing such rotary capacitors.

The primary object of the present invention is to reduce considerably the technical effort required for the insulated arrangement of the stator in the housing of rotary plate condensers and to improve the design in such a way that it facilitates a major simplification in the technical execution.

In accordance with a more specific object of the invention, the housing of the rotary plate condenser consists of synthetic plastic material or includes a bar made of insulating material (such a plate is attached in the housing). The connecting member is formed by the shaped metal part which includes at least three coupling portions, a first one of which at least serves to fasten the connecting member to the housing. More particularly, the first coupling portion passes through a corresponding opening contained in the housing and is deformed at its free end to fasten the connecting member in place. The other two coupling portions are connected with the stator and with the electrical conductor, respectively.

On the basis of the fact that, according to the invention, the connecting member includes several coupling portions which are directly fastened in the housing or on an insulating material part fastened in the housing, the stator as well as its connection can be fastened with a single structural component, whereby the same single-piece bending-stamping part can be produced in a cost-saving manner and in a one-step operation, whereby it can also be mounted and fastened by machine in the housing in a single operation.

Of the two coupling pieces, which are shaped onto the connecting member for fastening of the stator and for connecting the same to an electrical conductor, the coupling portion serving for connection, for example, can constitute a connecting lug or, to the extent that the housing of the rotary plate condenser, for example, is to be applied to a printed circuit, it can be made as a connecting pin which protrudes away from one of the housing walls. In one preferred version, however, the connecting member in addition to its three coupling pieces also includes at least one other connecting portion which constitutes a connecting pin which preferably comes to a point at the front and which protrudes on one housing side (preferably on the underside of the housing). A connecting member thus designed therefore offers any desired connecting possibility, whereby the connecting portion not used for this purpose can either be so bent to a position in which it will no longer be in the way, or it can be separated from the connecting member in a suitable fashion.

Preferably the two portions which are connected with the stator and with the electrical conductor, respectively, are aligned and are coplanar, the other portions (such as the fastening portion that extends through the housing opening, and the portion that serves to connect the rotary plate capacitor assembly to a base support) are normal to the plane of the aforementioned two portions.

With regard to the arrangement of the connecting member on the housing, there are various advantageous possibilities. One particularly favorable arrangement, for example, arises when the housing opening, which serves for the fastening of the connecting member, is arranged in one of the side walls of the housing and penetrates the latter in a lateral fashion. In this case, the connecting member as a whole can be inserted into this housing opening, and by bending of corresponding portions of the connecting member, the stable retention of the connecting member in the side wall can be achieved. For this purpose it is a good idea to have the connecting member comprise a stamped metal blank which is formed by the coupling portions which are aligned and which serve for fastening the stator to the housing and to the electrical lead, respectively, preferably the connecting member has a widened intermediate portion sealed in the housing opening, on which — at both sides — there are deformed a pair of tongue-like coupling portions which extend parallel to the housing wall, one of said coupling portions constituting a connecting pin. These tongue-like coupling portions, after the insertion of the blank-shaped main part, can by means of corresponding tools, be bent off at an angle to fasten the connecting means in the housing opening. Preferably this deformation is in the direction toward the lower housing part, so that the tongues will come to rest against the inside and outside surfaces, respectively, of the corresponding longitudinal housing wall, and so that they will thus guarantee the safe immovable retention of the connecting member in the housing. Furthermore, the connecting member can advantageously also be so fastened that, for this purpose, there is provided, on the housing underside, at least one flange-like rim which extends from the inside of one longitudinal housing wall in the direction toward the other longitudinal housing wall, in which the opening for the retention of the connecting member can be provided. Preferably this flange-like rim on the housing is deformed in one piece. In this case, the connecting member and the fastening portion must be so anchored in the housing opening that the ends of the other two coupling portions, serving for the fastening of the stator and for electrical connection, respectively, will protrude beyond the flange-like rim and the housing side wall, respectively.

Another advantageous development of such a design is that the connecting member is provided along the underside of the flange-like rim and is so designed that the coupling portion, forming a connecting pin, will extend downwardly and away from the connecting member. In this case we can achieve particularly reliable retention of the connecting member in the housing if, according to a further proposal of the invention, the connecting member reveals two coupling pieces arranged parallel to each other and which in each case pass through an opening of the flange-like rim.

If the stator is to be fastened on two opposite places on the housing, preferably two identical connecting members are provided in a symmetrical arrangement at opposite housing wall parts.

The invention is applicable also for rotary plate condensers in whose housing two or more stators have been fastened at opposite places on the housing side walls. In this regard it is particularly desirable to provide inwardly directed ribs of insulating material on the bottom edge portions of the housing side walls, whereby the connecting members may be fastened to the housing by means of fastening portions that extend through vertical openings contained in the flanges. This type of design furthermore can be improved and can be essentially simplified in terms of assembly technique in the following manner: the connecting members, which must be arranged at intervals on the same bottom portions, and which, in each case, are associated with another stator by means of a reparable connecting lash, whereby after they have been fastened on the housing, they may be separated from each other. This means that all connecting members can be attached (in the form of a single deformed stamped part) in one operation to the bottom pieces by deformation of the corresponding coupling portions. Furthermore, these parts can at the same time be insulated from each other by means of the separation of the connecting lashes which connect the individual connecting pieces with each other, whereby of course the design can also be so arranged that all connecting members to be fastened on both bottom pieces can be components of a single bending-stamping part.

Other objects and advantages of the invention will become apparent from a study of the following specification when viewed in the light of the accompanying drawing, in which:

FIG. 4 is a bottom view of a second embodiment of the rotary plate capacitor of the present invention;

FIG. 5 is a cross-sectional view taken along line 5—5 of FIG. 4; and

FIG. 6 is a detailed sectional view taken along line 6—6 of FIG. 5.

Figure 1:
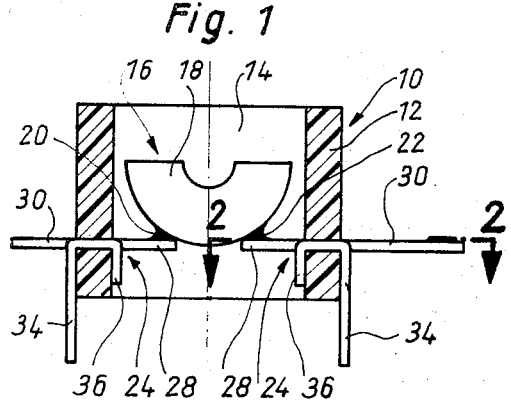
FIG. 1 is a cross-sectional view of a first embodiment of the rotary plate capacitor means of the present invention.
Figure 3:
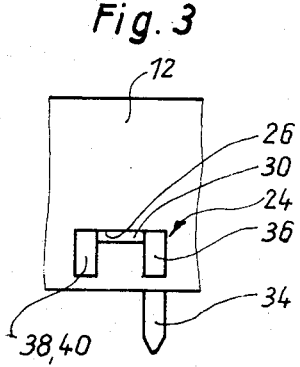
FIG. 3 is a side elevational view of the apparatus of FIGS. 1 and 2.
Figure 2:
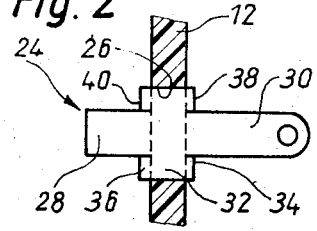
FIG. 2 is a detailed sectional view taken along the line 2—2 of FIG. 1.

The rotary plate capacitor according to FIGS. 1—3 comprises a rectangular housing 10 which is open at the top and the bottom and includes vertical side and end walls 12 and 14 respectively. Within this frame-like housing, the stator 16 is arranged in a fixed manner and associated with it there is a rotor (not shown) having a plurality of rotor plates which extend between the stator plates 18 in a known manner.

The stator is secured in the housing on opposite sides 20 and 22 by connecting members 24, which connecting members in each case are inserted into and are retained in a lateral opening 26 contained in the housing side walls 12. These connecting members are formed by bending a stamped part and include, for retention of the stator and for its electrical connection, a pair of aligned connecting portions 28 and 30, respectively, which are arranged in a common plane and which form a stamped main blank which, in turn, has a widened intermediate portion 32 which sits in a fitted manner in opening 26. On this intermediate portion there are formed — on both sides of the planar main part 28, 30 — a pair of tongue-like coupling portions 34, 36, and 38, 40 respectively, which extend parallel to the main part and, in each case, in opposite directions, whereby one coupling portion 34 is considerably longer than the other coupling portions which have the same length, said longer portion having a pointed free extremity which defines a connecting pin.

The connecting members 24 are symmetrically arranged opposite each other in the side housing walls (that is, the coupling portions 28, serving for the fastening of the stator, are pointed opposite each other, while the coupling pieces 30, which in each case form a connecting lug, protrude normal to the associated side wall 12). For the retention of the connecting members, their tongue-like coupling portions 34, 36, 38, 40, which are bent from the intermediate portion 32, are bent downwardly (as shown in FIG. 1) so that they will rest along the inside or outside of the particular longitudinal housing wall and thus guarantee perfect retention. The coupling piece which comes to a point at its free end which constitutes a connecting pin protrudes along the underside of the housing and thus makes it possible to put the rotary plate condenser, for example, on a corresponding contact base plate or to apply it on a printed circuit. By virtue of the fact that housing 10 consists of a shaped synthetic plastic part (it is not necessary to provide means for insulating) the coupling pieces 28 and 30 from the housing. The design of the connecting members and the housing according to the invention thus makes it possible to insert the connecting members into the housing opening 26 by machine and to fasten them there in a simple and quick manner by bending down the tongue-like coupling pieces, 34, 36, 38, 40, after which the stator 16, adjusted in the housing, can likewise be soldered on by machine at 20, respectively, 22.

The example of a rotary plate condenser, shown in FIGS. 4—6, likewise includes a housing 50 molded of synthetic plastic material in which several stators 52 are secured successively at mutually opposite places in the housing. For this purpose, the housing side walls 54 include bottom flange portions 58 and 60 for the fastening of stators 52 along their lower edge. These bottom portions in each case extend in the direction of the other housing side wall and define a central opening 62. Assume that the rotary plate condenser of the present invention includes a total of four stators 52 which are successively mounted in mutually insulated relation.

Each of these stators is secured between a pair of connecting members 64 which are arranged oppositely in a common plane beneath the two bottom portions 58, 60. For this purpose, two openings 68, 70 are provided in the bottom portions at spaced intervals, which extend two mutually parallel coupling portions 72, 74 of the coupling members. These coupling portions are wedged over at their free ends in the known manner so that the connecting members are firmly held on the level underside of the bottom pieces. Each connecting member includes a further coupling portion 76 which extends at its free end along the inside edge 78 of the bottom portion, as well as another coupling portion 80, constituting a connecting lug, which protrudes over the lower edge of the particular longitudinal housing wall. Both coupling portions are arranged in the same plane and accordingly extend in opposite directions. The stators are attached between the free ends of the coupling pieces 76 by means of soldered connections 82, 83. As shown in FIGS. 4 and 5, connecting portion 72, used for fastening the connecting members, is stamped out of the coupling portion 76 in the form of a tongue which is bent accordingly, while the coupling piece 74, likewise serving for fastening, is provided next to the coupling piece 80 constituting the connecting lug. In addition, the connecting members also include another coupling portion 84 which is present in the plane of the coupling piece 74, which is bent out to define a connecting pin, and with whose help the housing for example can be mounted on a printed circuit.

Since the rotary plate condenser has been assumed to include four stationary stators, a total of eight connecting members 64 are provided which must be arranged parallel to and opposite each other along the underside of the housing. The mounting of these coupling members can be considerably facilitated by applying the connecting members in the form of a single-piece bent, stamped part upon the underside of the bottom portions 58, 60. For this purpose, the individual connecting members are mutually connected with each other by a connecting member 86, indicated by the dot-dash line, which — after the wedging-over of the coupling pieces 72, 74 used for fastening purposes — is separated from the connecting members so that the connecting members are arranged in a mutually insulated fashion after fastening on the housing. It is also possible that both groups of connecting members to be fastened on the bottom portions 58, 60, might be connected with each other by additional connecting parts, so that only a single bending-stamping part must be handled during assembly.

While the preferred forms and embodiments have been illustrated and described, various changes and modifications, of course, could be made without deviating from the inventive concepts set forth above.

What is claimed is:

1. In a rotary plate capacitor including a housing having opposed pairs of side and end walls, a stator, connecting means securing said stator in said housing between a first pair of said opposed walls, and a rotor journalled between the other pair of said opposed walls for cooperation with said stator, the improvement wherein a. at least portions of said first pair of housing walls are formed from synthetic plastic material;

b. and further wherein said connecting means comprise at least one pair of connecting members 24, 64 each formed from a conductive metal blank, each of said connecting members including at least three coupling portions, 1. a first one of said coupling portions being mounted in an opening contained in the synthetic plastic housing wall portion, said first coupling portion being deformable to fasten the connecting member to the housing;

2. a second one of said coupling portions extending within the housing for connection at its free end with the stator; and 3. a third one of said coupling portions extending outwardly from the housing for connection with an electrical conductor.

2. Apparatus as defined in claim 1, wherein said connecting member includes a fourth coupling portion 34, 84 that extends outwardly from the housing.

3. Apparatus as defined in claim 2, wherein said fourth portion extends downwardly from the housing and terminates at its free end in a pointed extremity.

4. Apparatus as defined in claim 1, wherein said second and third coupling portions are coplanar; aligned; and arranged normal to the vertical plane which contains the axis of rotation of the rotor; and further wherein said first coupling portion is normal to the plane which contains said second and third coupling portions.

5. Apparatus as defined in claim 1, wherein each of the housing openings 26 has a generally rectangular cross-sectional configuration, and further wherein the body portion of each connecting member has a cross-sectional configuration that corresponds with the housing opening, said coupling member including pairs of tongue portions 38, 40, 34, 36 that are bent normal to said body portion on opposite sides of, and in continuous engagement with, said housing wall.

6. Apparatus as defined in claim 1, wherein each of the first pair of side walls of said housing includes at its lower end an inwardly directed flange portion 58 which contains said housing opening, said first coupling portion 74 extending through said opening and terminating at its free end in a deformed extremity for fastening said coupling member with said housing, said second coupling portion 76 projecting beyond said flange portion into said opening for connection with said stator, and said third coupling portion 80 being aligned and coplanar with said second portion and extending outwardly from said housing.

7. Apparatus as defined in claim 6, wherein said connecting member is arranged horizontally beneath the housing flange portion, and further wherein said connecting member includes a downwardly extending fourth portion 84 which is formed to define a connecting pin.

8. Apparatus as defined in claim 7, wherein said connecting member further includes a fifth portion 72 that is parallel with and spaced from said first portion, said fifth portion also extending through an opening contained in said flange portion and being deformed at its free extremity to fasten said connecting member with said housing.

9. Apparatus as defined in claim 1, wherein the connecting members of each pair are arranged symmetrically at mutually opposite places on the housing side walls.

10. Apparatus as defined in claim 9, wherein at least two stators are supported by said connecting members within said housing, the side walls of said housing including at their lower edges inwardly directed horizontal flanges, said connecting members being spaced beneath said horizontal flanges, respectively, and extending horizontally beyond both sides of said side walls for connection with the stators and with corresponding electrical conductors, respectively.

11. Apparatus as defined in claim 10, and further including removable spacer means 86 for supporting said connecting elements in spaced relation during assembly of the rotary plate capacitor.

* * * * *